United States Patent [15] 3,672,238
Young et al. [45] June 27, 1972

[54] EXTENDABLE AND RETRACTABLE SUPPORTS

[72] Inventors: Charles H. Young, Elkhart; Donald L. Ray, South Bend, both of Ind.

[73] Assignee: Ski-Tow Manufacturing Co., Elkhart, Ind.

[22] Filed: Feb. 18, 1970

[21] Appl. No.: 12,387

[52] U.S. Cl. ............................. 74/89.2, 296/23.3, 254/144
[51] Int. Cl. ....................................................... F16h 27/62
[58] Field of Search ........................... 74/89.2, 89.21, 89.22; 254/143, 144, 145; 296/33, 23, 26, 27; 248/328, 404

[56] References Cited

UNITED STATES PATENTS 3,497,042   2/1970   Angermheller .................... 248/404
2,055,930   6/1936   Josephs .............................. 254/144

FOREIGN PATENTS OR APPLICATIONS 106,933     12/1938   Australia ........................... 296/23.3
1,200,438   6/1959    France ............................... 296/23.3

Primary Examiner—William F. O'Dea
Assistant Examiner—Wesley S. Ratliff, Jr.
Attorney—William D. Stokes

[57] ABSTRACT

An extendable and retractable support system for raising and lowering the top of a vehicle in which telescope assemblies at the four corners are connected by cables to a winch assembly. The cables are pinned to individual guides which have slots spaced apart the thickness of the cable to provide even movement. The telescope assemblies each include rigid, internal rods with pulleys near the end having circumferentially disposed cable hoods carried by the rods above the pulleys to provide strong, but economic assemblies in which the cable will not come out of operative position.

20 Claims, 13 Drawing Figures

INVENTORS
CHARLES H. YOUNG
DONALD L. RAY

BY *William D. Stoker*

ATTORNEY

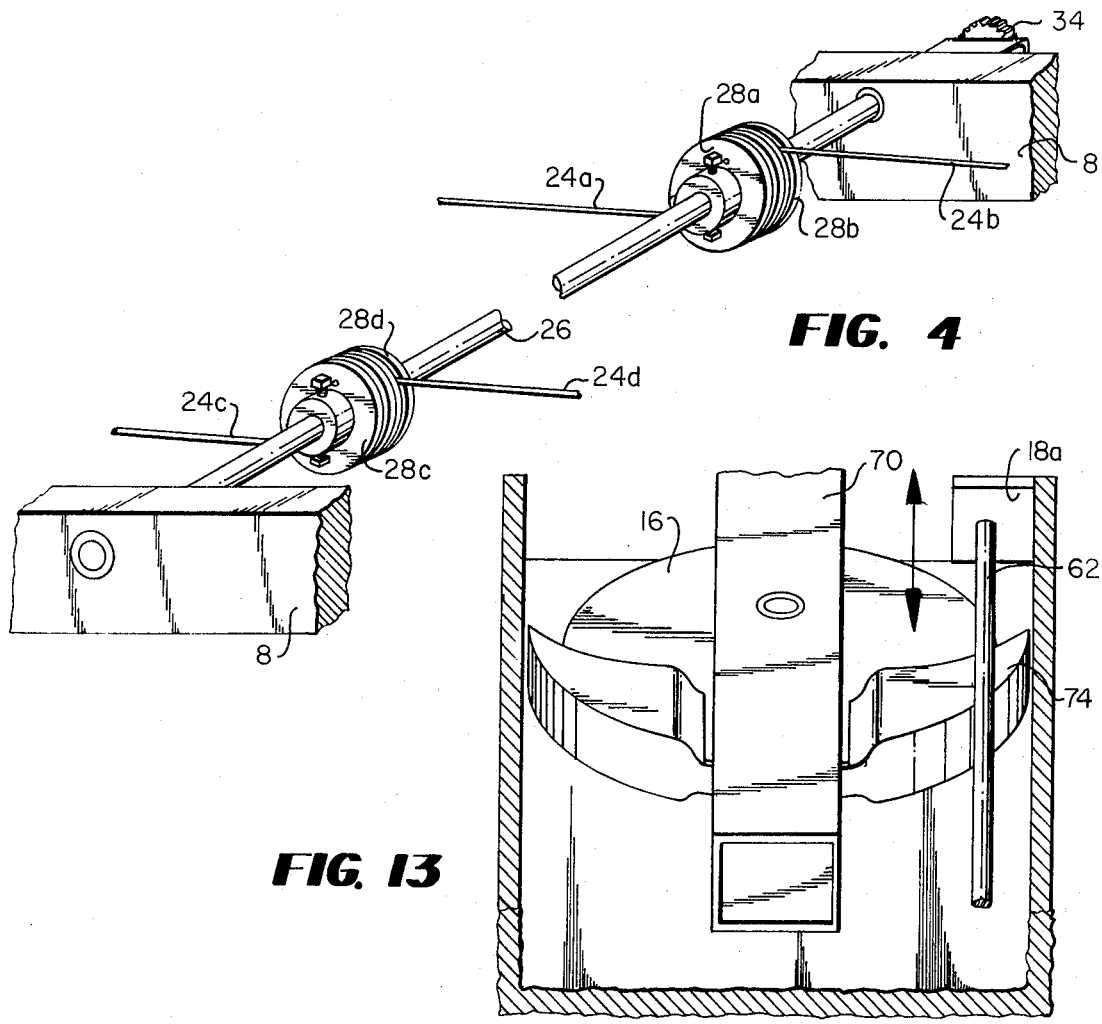
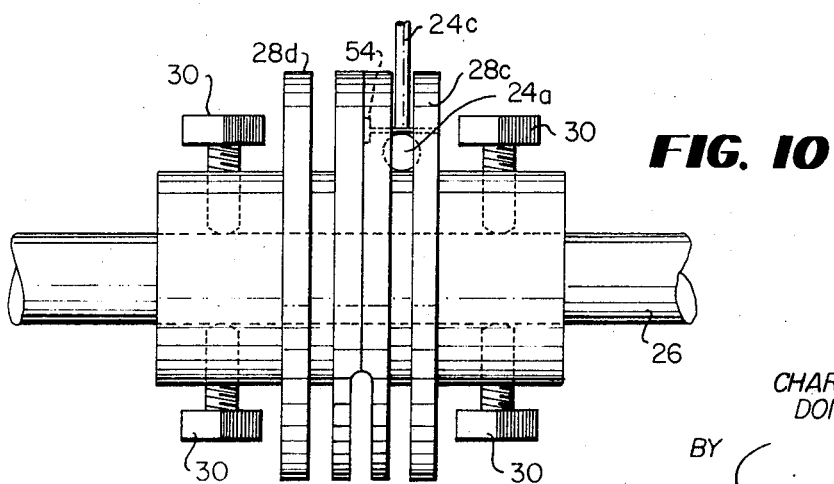
INVENTORS
CHARLES H. YOUNG
DONALD L. RAY
BY William W. Stokes
ATTORNEY

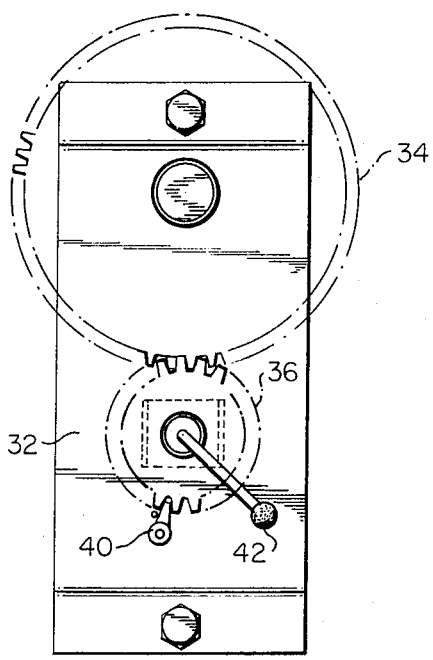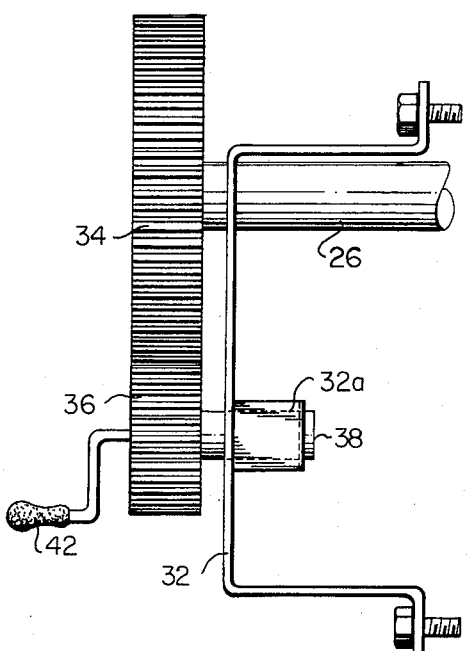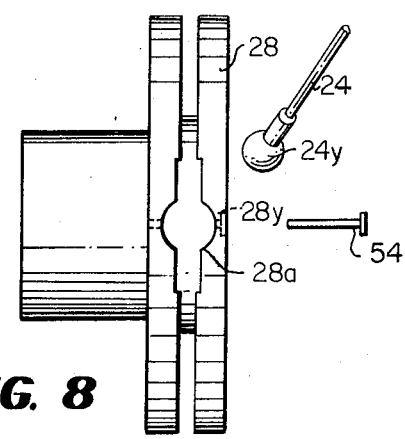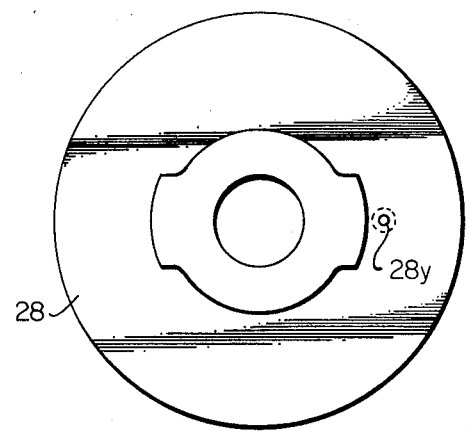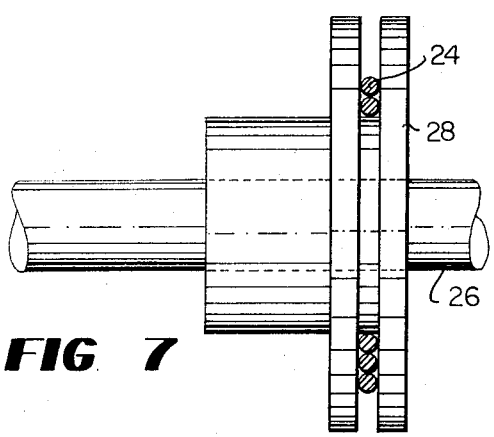

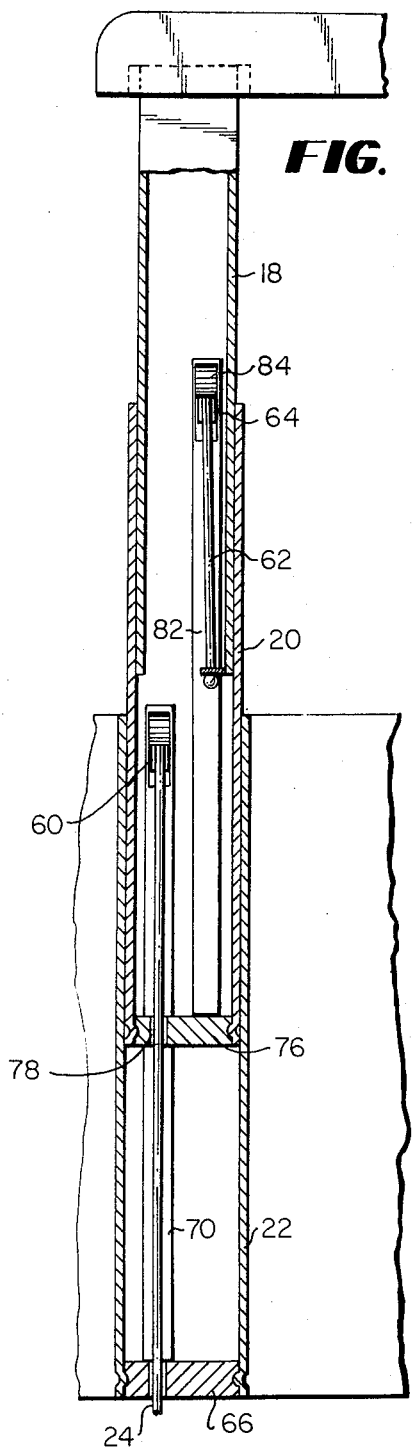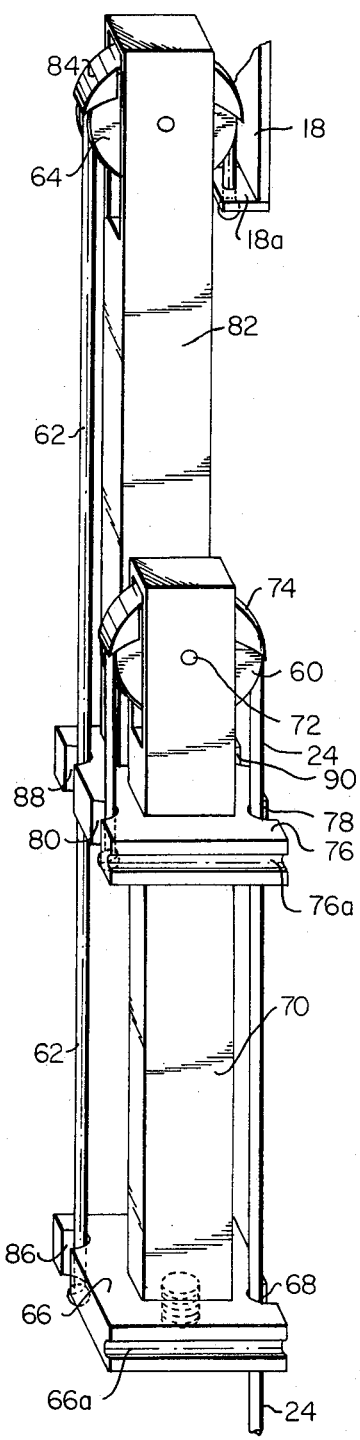
FIG. 11
FIG. 12
INVENTORS
CHARLES H. YOUNG
DONALD L. RAY
BY *William A. Stokes*
ATTORNEY

EXTENDABLE AND RETRACTABLE SUPPORTS

This invention relates to support means and particularly to support means which may be extended and retracted. More specific aspects of this invention relate to extendable and retractable support means which have utility for vehicles and the like for raising and lowering the roof member thereof to increase and decrease headroom.

Vehicles, such as those represented by trailers, particularly camping trailers designed for periodic use, are more effective, useful and desirable if the roof of the camper can be lowered during periods of transportation to decrease wind resistance, increase stability of the vehicle on the road and the like. After being towed to the camping area in the lowered position, it is desirable that the headroom be increased to provide comfort during occupancy of the trailer. This is ordinarily accomplished by elevating the roof member and supporting it in the elevated position by means of standards.

It is an object of this invention to provide improvements of conventional systems in which a simplified structure is provided which is operative to lift evenly.

It is another object of this invention to provide improvements of conventional systems in which a simplified structure is used, which is efficient and economic in fabrication and is less subject to malfunction and the need for expensive maintenance.

It is another, more specific object of this invention to provide a telescope assembly which is simplified and is such that the cables of the assembly are kept in operative positions on the pulleys of the assembly.

It is another more specific object of this invention to provide a cable mounting assembly which is simple, inexpensive, and convenient.

In accordance with this invention, a plurality of extendable supports are provided which are under control of a cable individual to each of them. The cables are connected to a single winch assembly by which they are wrapped and loosened to control extension or retraction of the supports. Guide means are provided for each cable which cause each cable to stack directly upon itself. The extendable supports may be telescoping members basically of conventional design. In accordance with the more specific aspects of this invention, however, internal rods are provided in certain of the telescoping members which sturdily and reliably support pulleys at positions generally corresponding to those of the conventional systems. Immediately above the pulleys and integral with the rods, are hood or cap elements located to substantially block the cables from the possibility of moving off the pulleys, while not obstructing the normal telescopic movement of the telescoping members. In a preferred form, the cables are pinned to the bottom of the slots of the guides and two guides are positioned contiguously to mutually obstruct the pins so that they cannot come out or separate from the holding positions.

The invention will be more clearly explained and definitely pointed out by reference to the following description and to the attached drawings in which:

FIG. 4 is a top perspective view from the front of the vehicle showing major elements of the winch assembly and guides;

FIG. 5 is a front view of the support bracket and gears of the winch system;

FIG. 6 is a side view of the support bracket and gears of the winch system;

FIG. 7 is a sectional view of one of the slotted guide members having a cable wrapped thereon;

FIG. 8 is a view from the side of one of the guide members showing the opening to receive an enlarged end of the cable;

FIG. 9 is a view from the left of FIG. 8 of one of the guide members;

FIG. 10 shows two of the guide members mounted for normal use in the winch system;

FIG. 11 is a cross-section of the telescope support assembly in a partially extended position and showing the internal workings thereof;

FIG. 12 represents a top, perspective view of the internal parts of the telescope support assembly showing the rods, the pulley mounting, the cables, the hoods, and the connection to the upper member; and FIG. 13 is a perspective view from the top showing one hood and the clearance of the hood with the tab of the top telescoping member.

Figure 1:
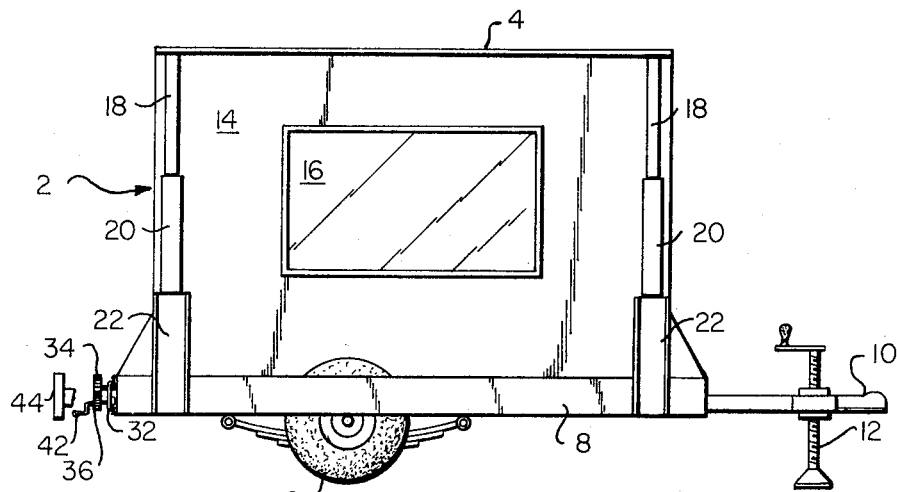
FIG. 1 is a side view from a section taken just inside the outer wall of a typical vehicle showing two of the extendable and retractable support members in their extended position.
Figure 2:
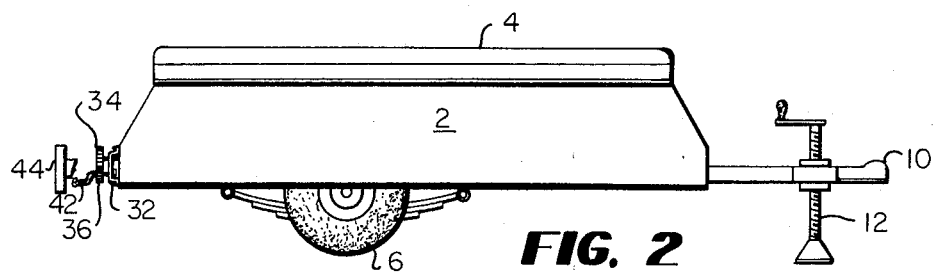
FIG. 2 is a side view of the same vehicle with the extendable and retractable support members in their retracted position so that the roof member is lowered; the outer side wall is shown, which covers the extendable and retractable support members.

In the drawings outlined above, reference numeral 2 designates a body portion of a vehicle shown in FIG. 1 as a camper trailer having an extendable roof member 4, wheels 6, a rectangular, rigid frame 8, towing device 10, and support mechanism 12. A fabric material 14 may be provided for the side walls of the trailer when the trailer is in the extended position. It is to be understood that the side walls of the trailer may also be formed from rigid materials of many types, such as molded plastic and metal.

The side wall may be fitted with a window of screening material shown at 16. The supporting members for the roof comprise extendable and retractable standards, one at each of the four corners, having concentric, rectangular telescopic sections 18, 20, and 22. Each of the four telescopic sections is under the external control of one of the strong, flexible cables 24a, 24b, 24c, and 24d, which preferably are of wound, steel strands which preferably are externally coated with nylon or other strong, protective plastic.

The cables 24 are directed by pulleys to a winch system which is located conveniently at the center rear of the trailer. The winch system comprises a horizontal shaft 26 under the trailer extending the length of the trailer and journaled to the frame 8 by conventional bearings at the front and rear. On shaft 26 are four slotted guide members 28a, 28b, 28c and 28d, each attached to shaft 26 for movement with it by set screws 30 (FIG. 10). Two guides 28 are positioned on shaft 26 on each end generally opposite the telescopic support assembly with which they are operatively associated.

FIG. 7 is a sectional view of one of the slotted guide members showing a cable 24 partially wrapped into it. Since the guide members 28 turn with shaft 26, the sides of the guides between which each cable 24 is wrapped are substantially perpendicular to the axis of turning of the guide 28.

A bracket 32 which supports parts of the winch system is bolted to the rear beam of the frame 8. At the end of shaft 26 is a large gear 34, which meshes with relatively small gear 36 on shaft 38. As shown in FIG. 6, shaft 38 is parallel to shaft 26 and journaled at longitudinally spaced points at the front of bracket 32 and at an extension 32a. Also associated with large gear 34 is a braking pawl 40 (FIG. 5) which is biased into gear 36 and operative in the conventional manner to lock gears 36 and 34 in place during the times when it is desired that the positions assumed be held.

Attached to gear 36 is hand crank 42 which is turned manually to control the action of the winch. Bumper 44 is a strong member which is solidly connected to the rear beam of frame 8. The hand crank 42, along with the gears 34 and 36 are positioned within bumper 28, and are thereby conveniently located and at the same time, protected. Enough spacing is left to provide ample hand room during use of the winch. (The winch may be differently positioned if desired. An immediate alternative is to position the crank at the front, provided supplies or parts carried at the front of the trailer do not obstruct the front too much for that purpose.)

Figure 3:
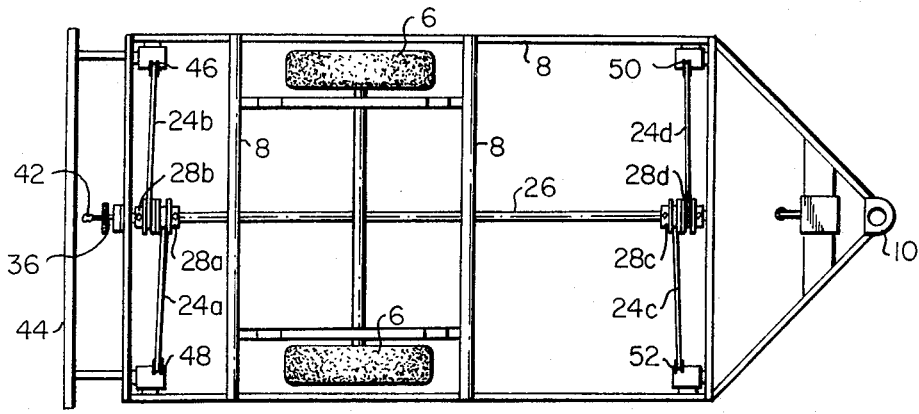
FIG. 3 represents a view of the underside of the same vehicle showing each of the extendable and retractable support members being operatively connected together by the cables from each of them to a winch system which permits operation of all of the extendable and retractable support members.

As best shown in FIG. 3, the cables 24 are directed into the slotted guide members 28 by pulleys appropriately mounted on the underside of the frame 8. Thus, cable 24b, which is associated with the left rear support, is directed laterally into guide 28b by pulley 46. Cable 24a, which is associated with the other rear support, is directed similarly by a pulley 48 into guide 28a. Similarly, cable 24d, which is associated with a front support is directed laterally into guide 28d by pulley 50 and cable 24c is directed laterally by pulley 52 into guide 28c.

Operation of hand crank 42 in a counterclockwise direction as viewed from the rear of the trailer is translated through large gear 34 into movement of shaft 26 and to movement of guide members 28 in the clockwise direction. Each of the cables 24a, 24b, 24c, and 24d is wrapped around its individual guide 28a-28d in the direction so that the clockwise turning tightens all of the cables 24.

All of the guides 28 and all of the cables 24 are of substantially identical dimensions. Furthermore, the sides of guides 24 are separated at most only slightly more than the diameter of cables 24 for the purpose of causing the cable 24 to wrap upon itself directly upon the outermost side of the lower layer of cable.

Minor adjustments to equalize the positions of all of the guides 28 may be made. Each guide 28 is rotated slightly to make such an adjustment and then the screws 30 are tightened to maintain the position during subsequent ordinary use. In this manner, the starting position of all of the cables 24a through 24d is made the same so that wrap-up around guides 28a through 28d will be translated as the same amount of movement to all of the cables 24.

Differences and variations between the movements of the different cables 24 are thereby eliminated. The cables 24 are positively held in such a way that they are moved equally, and the roof member 4 is thereby moved evenly.

The cables 24 are preferably attached to the guide members 28 by a unique and efficient arrangement. As shown in FIG. 8 each cable 24 carries crimped to it at its end an enlarged metal nob 24y. Each guide 28 has a widened section or well 28 (FIG. 8) which will receive the nob 24y and allow nob 24y to be positioned at the bottom of the slot formed by the sides of guide 28.

Guide 28 also has a recessed, pin receiving portion 28y, adapted to receive a pin 54. After nob 24y is inserted, pin 54 is positioned in the recess 28y to obstruct nob 24y and thereby hold cable 24 in place.

In the final assembly, as shown in FIG. 10, two guides 28 are positioned close together on shaft 26 with the flat surfaces near pin 54 facing each other. The pins 54 are held in place during normal operation by the obstruction of the contiguous guide 28.

Each of the four telescopic standards at the corners of the roof 4 is substantially identical. As shown in FIG. 11, each is comprised of a bottom section 22, a middle section 20, and an upper section 18. The sections fit within one another and therefore "telescope" together. The sections are preferably rectangular and need not be of solid sheet, but preferably will have parts cut away throughout the surface since this saves metal while sufficient strength for the purposes intended remains.

A first pulley 60 is mounted above the lower end of middle section 20, and the cable 24 passes freely through the bottom of section 22, upward over pulley 60 and downward to rigidly connect with the bottom of middle section 20.

A second cable 62 is rigidly fastened to the bottom of bottom section 22, passes over a second pulley 64 which is mounted above the lower end of upper section 18, and is rigidly connected to the bottom of upper section 18.

The telescopic assembly as just broadly described is entirely conventional. It will be clear that downward movement of cable 24 is translated to an equal movement upward of intermediate section 20, and that the movement of section 20 is translated through pulley 64 to cable 62 and from cable 62 as an equal upward movement to upper section 18. Relaxation of cable 24 results in a reversal of these movements under the weight of the middle and upper support members 20 and 22, and of the parts supported by them.

The internal members of the telescopic assembly are shown isolated in FIG. 12. Reference is made to both FIGS. 11 and 12. A thick, heavy metal, bottom plate 66 is rigidly connected to bottom member 22 by criming of the metal sides of section 22 into slots 66a, on opposite sides of plate 66. The bottom plate 66 has a passage or slot 68 cut in its side to freely pass cable 24. Upwardly extending rod 70 is firmly held on plate 66 by a threaded end of reduced size which is inserted into a corresponding threaded opening in plate 66 and screwed into position. Rod 70 is on one side of plate 66.

Cable 24 extends upward over pulley 60 which is journaled to rod 70 near the top by a welded pin 72 on which a plastic bushing is journaled. Connected to rod 70 just above the top of pulley 60 is a cowl or hood member 74, which is made of thin metal extends through a slot in rod 70 and is spread outwardly enough on each side so as to be keyed in place in rod 70. Hood 74 is located close enough to block the cable from leaving pulley 60. In the preferred embodiment shown, hood 74 extends past the main body of rod on both sides and fits generally around the top part of the pulley to points almost contacting the sides of closest telescopic member 18. Hood 74 is wrapped close to the sides of pulley 60 to allow the tab portion 18a of telescopic section 18 to move freely (FIG. 13).

As an alternative, rod 70, just above the top of pulley 60, may be fashioned to be closely spaced so as to not permit cable 24 to have room to leave pulley 60, but with sufficient room left for free movement of cable 24 around pulley 60.

A similar bottom plate 76 is integral with the lower end of intermediate section 20. The member 20 is crimped to plate 76 at slots 76a, on opposite sides of plate 76. Cable 24 extends up freely through slot 78 in the side of plate 76, over pulley 60, and then down to attach to plate 76 at connection slot 80. Thus, a tightening of cable 24 is translated to plate 76, and thereby directly to intermediate member 20.

Rod 70 passes freely through plate 76 at an opening provided on one side of plate 76. Next to rod 70 on the other side of plate 76 a similar rod 82 is positioned. Rod 82 is screwed in place on plate 76 essentially identically as described with regard to the mounting of rod 70.

The pulley 64 is carried by rod 82 near the end of rod 82. Spaced above pulley 64 integral with rod 82 is a second hood member 84, which blocks the cable 62 from leaving pulley 64. The pulley 64 and hood 84 are essentially identical in structure and function as described with regard to pulley 60 and hood 74, although clearance with member 18a is, of course, not a factor with regard to hood 84.

The cable 62 is rigidly connected to bottom plate 66 at slot 86. Cable 62 passes freely through a slot 88 in plate 76, passes over pulley 64 and is rigidly connected at tab 18a with the bottom of upper telescopic section 18. As rod 82 is moved upwardly by plate 76, pulley 64 moves upwardly against cable 62 to move that cable and upper section 18 with it.

In the specific embodiment, the cables 24 and 62 carry metal nobs crimped on at the ends which terminate in the telescopic assembly. Slots 80 and 86 are cut with a countersunk hole to hold the nobs and tab 18a is formed with a hole smaller than the nob. As the cables 24 and 62 are tightened, they come in contact with and apply moving force at the place of contact.

The assembly shown in FIG. 12 is for a right hand telescope assembly as viewed facing the front of the trailer. Left hand standards contain a mirror image of the bottom plate 66. The plate 76 is made for use in both. Slot 78 is therefor countersunk for holding the end of a cable. In the left hand standard slot 80 freely passes the intermediate part of the cable and slot 90 is used instead of slot 88.

The telescopic assembly functions well, and is sturdy and reliable. The rods 70 and 82 position the pulleys 60 and 64 directly in the path of the cables which are carried by the pulleys. The hood or cowls 74 and 84 or the equivalent carried by the rods 70 and 82 near the pulleys contribute important reliability in that loss of operative contact between the pulleys and the corresponding cables is substantially eliminated in all normal situations of use.

It will be apparent that the invention described can be utilized in various forms, and that the scope of protection should therefore be in accordance with the true scope of the general aspects of the invention and as provided by law, with particular reference to the accompanying claims.

What is claimed is:

1. A trailer having an extendable and retractable roof support system comprising a plurality of extendable and retractable support members each operable in response to movement of a cable, a winch system to take up and release said cables, and an individual guide member in said winch system for each of said cables adapted to guide each of said cables to wrap upon itself upon the outermost side of the lower layer of cable.

2. The system as in claim 1 in which each said individual guide comprises a slot having two sides generally perpendicular to the axis of turning of said winch system in the area of said guide and separated enough to receive said cable, but separated at most only slightly more than the diameter of said cable.

3. The system as in claim 1 in which said support members are plural member telescopic assemblies with at least one internal pulley.

4. The system as in claim 2 in which said support members are plural member telescopic assemblies with at least one internal pulley.

5. The system as in claim 3 in which said telescopic assemblies comprise an internal rod disposed in the direction of telescopic movement, the base of said rod being integral with a said telescopic member, said rod supporting a said pulley spaced substantially away from said base.

6. The system as in claim 4 in which said telescopic assemblies comprise an internal rod disposed in the direction of telescopic movement, the base of said rod being integral with a said telescopic member, said rod supporting a said pulley spaced substantially away from said base.

7. The system as in claim 5 in which said rod has integral with it, structures positioned to obstruct said cable from leaving said pulley, but not positioned to obstruct free movement of said cable around said pulley.

8. The system as in claim 6 in which said rod has integral with it, structures positioned to obstruct said cable from leaving said pulley, but not positioned to obstruct free movement of said cable around said pulley.

9. The system as in claim 7 in which each said cable has an enlarged end which is held by a pin to the said guide which guides the said cable, and in which two of said guides are positioned contiguously to mutually obstruct the said pins in said guides from moving from the holding positions.

10. The system as in claim 8 in which each said support member is a three member telescopic assembly with one end member carrying a said rod supporting a said pulley and with a middle member carrying a different said rod supporting a different said pulley.

11. The system as in claim 10 in which each said cable has an enlarged end which is held by a pin to said guide which guides the said cable, and in which two of said guides are positioned contiguously to mutually obstruct the said pins in said guides from moving from the holding positions.

12. An extendable and retractable assembly comprising at least two members mounted for relative movement, one of said members carrying a rod which extends in the direction of said relative movement, and a pulley supported by said rod positioned for control of the relative movement of said members by a cable, said rod having integral with it covering means positioned to obstruct said cable from leaving said pulley, but not positioned to obstruct free movement of said cable around said pulley.

13. The assembly as in claim 12 in which said covering means is located close to said pulley so as to not obstruct a member which moves past said pulley during extension and retraction of said assembly.

14. The assembly as in claim 12 in which said assembly is a telescopic assembly of at least three members with one end member and one middle member, each said end member and said middle member carrying a different said rod supporting a different said pulley, said rods being located inside said assembly.

15. The assembly as in claim 12 in which said coverings means positioned to obstruct are a thin sheet extending generally partially around said pulley away from the main body of said rod.

16. The assembly as in claim 15 in which said assembly is a three member telescopic assembly with one end member and a middle member, each said end member and said middle member carrying a different said rod supporting a different said pulley, said rods being located on substantially different sides inside said assembly.

17. The assembly as in claim 16 in which said covering means to obstruct the cable from leaving the pulley supported by the rod carried by the middle member is wrapped close to said pulley so as to not obstruct the top member during expansion and retraction of said assembly.

18. The assembly as in claim 17 in which said end member and said middle member include plates to which sides are crimped and in which said plates have slots extending to the sides of said plates to receive the cables in said assembly.

19. An assembly for holding the ends of cables comprising, two cables, each having an enlarged part on its end; two positionable members having pins, each having a well to receiving the said enlarged part of one of said cables, and each having a recess to receiving the said pin in a position to hold the said enlarged part of the cable received in the respective member, said positionable members being firmly positioned contiguously to mutually obstruct the said pins from moving from the holding positions.

20. The assembly as in claim 19 in which said members are guides for wrapping said cables, each in a single layer upon itself and are positioned on a shaft by set screws.

* * * * *